United States Patent [19]

Teumac et al.

[11] Patent Number: 4,757,094
[45] Date of Patent: Jul. 12, 1988

[54] MELAMINE CURED POLYURETHANE FOAM WITH IMPROVED PROPERTIES

[75] Inventors: Fred N. Teumac, Spartanburg, S.C.; Michael A. Ricciardi, Statesville, N.C.; Ronald L. Murph, Charlotte, N.C.; Gregory W. Howard, Charlotte, N.C.

[73] Assignee: Reeves Brothers, Inc., Spartanburg, S.C.

[21] Appl. No.: 52,346

[22] Filed: May 21, 1987

[51] Int. Cl.$^4$ .............................. C08G 18/14
[52] U.S. Cl. ...................... 521/118; 521/128; 521/163; 521/164
[58] Field of Search ............ 521/118, 128, 163, 164

[56] References Cited

U.S. PATENT DOCUMENTS

| | | | |
|---|---|---|---|
| 3,297,597 | 1/1967 | Edwards et al. | 260/2.5 |
| 3,341,482 | 9/1967 | Gmitter et al. | 260/2.5 |
| 3,399,151 | 8/1968 | Kaiser | 260/2.5 |
| 3,462,381 | 8/1969 | Eaton et al. | 260/2.5 |
| 3,622,526 | 11/1971 | Zorn | 260/2.5 AK |
| 3,681,273 | 8/1972 | Jelly | 260/2.5 |
| 3,726,835 | 4/1973 | Bertozzi | 260/75 NK |
| 3,803,063 | 4/1974 | Krentz, Jr. | 260/2.5 AJ |
| 3,824,239 | 7/1974 | Narayan et al. | 260/249.5 |
| 3,897,372 | 7/1975 | Kehr et al. | 260/2.5 AJ |
| 4,008,185 | 2/1977 | Olstowski | 260/2.5 AC |
| 4,042,537 | 8/1977 | Dahm et al. | 260/2.5 AP |
| 4,066,578 | 1/1978 | Murch et al. | 260/2.5 AG |
| 4,098,729 | 7/1978 | Kollmeier et al. | 521/128 |
| 4,137,626 | 1/1979 | Edwards et al. | 260/570.9 |
| 4,139,501 | 2/1979 | Rudner et al. | 521/136 |
| 4,143,029 | 3/1979 | Matthews et al. | 260/45.8 NT |
| 4,162,276 | 7/1979 | Rim et al. | 525/2 |
| 4,197,373 | 4/1980 | Miano et al. | 521/128 |
| 4,221,875 | 9/1980 | Yukuta et al. | 521/128 |
| 4,246,146 | 1/1981 | Woods et al. | 260/9 |
| 4,258,141 | 3/1981 | Jarre et al. | 521/114 |
| 4,293,657 | 10/1981 | Nissen et al. | 521/121 |
| 4,317,889 | 3/1982 | Pcolinsky, Jr. | 521/107 |
| 4,335,029 | 6/1982 | Dabi et al. | 524/589 |
| 4,369,258 | 1/1983 | Johnson | 521/107 |
| 4,374,207 | 2/1983 | Stone et al. | 521/107 |
| 4,374,209 | 2/1983 | Rowlands | 521/116 |
| 4,385,131 | 5/1983 | Fracalosi et al. | 521/55 |
| 4,387,194 | 6/1983 | Ottaviani et al. | 525/454 |
| 4,390,642 | 6/1983 | Smith | 521/112 |
| 4,421,868 | 12/1983 | Smith | 521/112 |
| 4,438,028 | 3/1984 | Schmittmann et al. | 252/609 |
| 4,451,622 | 5/1984 | DiDomenico, Jr. | 525/456 |
| 4,481,308 | 11/1984 | Gray | 521/120 |
| 4,485,195 | 11/1984 | Brennan et al. | 521/167 |
| 4,515,632 | 5/1985 | Maurer et al. | 106/18.16 |
| 4,579,876 | 4/1986 | Ilipulos | 521/136 |
| 4,617,286 | 10/1986 | Arai et al. | 502/167 |
| 4,644,015 | 2/1987 | Scaccia et al. | 521/252 |

FOREIGN PATENT DOCUMENTS

| | | |
|---|---|---|
| 2043917 | 3/1972 | Fed. Rep. of Germany . |
| 2348838 | 4/1975 | Fed. Rep. of Germany . |
| 3407007 | 8/1985 | Fed. Rep. of Germany . |
| 3411327 | 10/1985 | Fed. Rep. of Germany . |
| 1029963 | 5/1966 | United Kingdom . |
| 1030162 | 5/1966 | United Kingdom . |
| 1453258 | 10/1976 | United Kingdom . |
| 2094315 | 9/1982 | United Kingdom . |
| 2163762 | 5/1986 | United Kingdom . |

OTHER PUBLICATIONS

Ozawa et al., Effect of Various Additives on the Photodegradation of Polyurethanes (1984).
Chemical Abstracts, 85(20) 144070a (1976).
Chemical Abstracts, 85(18) 125105z (1976).
Chemical Abstracts, 73(6) 26206d (1970).
Chemical Abstracts, 69(2) 3611k (1968).
Chemical Abstracts, 99(4) 23618r (1983).
Chemical Abstracts, 101(8) 56594t (1984).
Chemical Abstracts, 101(8) 56593s (1984).
"Fire-retardant Flexible Urethane Foams Debut," C & E News, Apr. 1, 1985, p. 18.
"A New Foam for Furniture," Chemical Week, 4/3/85, p. 10.
BASF Press Release, Pluracol Polycol C-133, 3/25/85.
BASF Technical Bulletin, Pluracol Polyol C-133, 3/85.
MCI Melamine Bulletin (1980).
BASF Technical Bulletin, Pluragard Melamine (10/85).
BASF Melamine Modified Slab Foams (1986).
Solodovnik et al., Effect of Fillers on Physico-Mechanical Properties and Flammability of Polyurethane Foam (1983).
"Flame Retardancy Gain Seen," Chemical Marketing Reporter, Apr. 1, 1985, p. 3.
"Foams Show Improvement Over Time," Journal of Commerce, Wednesday, Mar. 27, 1985.

*Primary Examiner*—Maurice J. Welsh
*Attorney, Agent, or Firm*—Pennie & Edmonds

[57] ABSTRACT

Flexible polyurethane foam forming compositions comprising a polyether polyol, an organic isocyanate compound, a blowing agent, and a curing agent, preferably melamine, in an amount effective to rapidly cure the resultant foam and improve the compression set properties of the foam, the amount of curing agent generally ranging from about 0.25 up to about 4 parts by weight based on 100 parts polyether polyol. Also, the composition of polyurethane foams and methods of forming same from such foam-forming compositions.

34 Claims, No Drawings

MELAMINE CURED POLYURETHANE FOAM WITH IMPROVED PROPERTIES

TECHNICAL FIELD

The invention relates to flexible polyurethane foam-forming compositions and methods of forming polyurethane foam therefrom in which a curing agent, preferably melamine, is added to the foam-forming components to rapidly cure the foam after formation as well as to concurrently improve the compression set properties of the foam.

BACKGROUND ART

Polyurethane foam is prepared commercially in the form of large blocks that are subsequently cut into the desired shape for use in the manufacture of various articles that require a foam padding. It is well known that polyurethane foam requires time to cure and develop its full physical properties. In typical polyurethane foam formulations, a polyhydroxy material ("polyol"), water and an organic isocyanate compound are reacted in the presence of catalysts or other additives. Much of the time, a small percentage of terminal isocyanate groups are left unreacted in the foam structure. If the foam is distorted or compressed in this condition, it fails to recover its original dimensions when the distortive or compressive force is released. Normally, the terminal isocyanate groups that are left unreacted in the foam structure will react with the residual water in the foam structure or with the water vapor in the atmosphere over a period of several hours or days, and the foam will ultimately achieve its full physical properties.

As pointed out in the Encyclopedia of Polymer Science and Technology (John Wiley and Sons, New York 1969) in the section on Polyurethanes, polyethers are commercially the most important of the polyols used to prepare polyurethanes. At the present time most of the polyethers used in the production of flexible polyurethane foams are derived from propylene oxide and ethylene oxide. In this preparation, propylene oxide is reacted with glycerol in the presence of a basic catalyst to form a poly(oxypropylene) homopolymer which is further reacted with ethylene oxide to form a block copolymer.

According to the prior art, melamine has been used in both flexible and rigid foams as a fire retardant additive, either alone or in combination with other materials such as silica, alumina, halogenated phosphorus ester compounds, and the like.

For example, British Patent Specification No. 2,094,315 discloses an intumescent, highly resilient polyether urethane foam prepared by reacting a polyether polyol, an organic polyisocyanate, a catalyst, a surface active agent, a blowing agent, an intumescent material, a carbonific element for forming a carbonaceous char by reaction with the acid liberated from the intumescent material, and, optionally, a spumific element for generating non-flammable gases which contribute to the intumescence and to a reduction of the effects of flame on the surface of the resulting foam. Melamine is discosed as a suitable spumific element, and the examples show the use of 10 or 20 parts melamine based on 100 parts polyol.

Another example of the use of melamine in flame-resistant flexible polyurethane foams is found in U.S. Pat. No. 4,258,141. These foams generally contain a specific aromatic isocyanate compound, a polyol, flame inhibitors, and blowing agents, with optional additions of chain extenders and other additives. The amount of melamine (or other cyanic acid derivative) ranges from 10 to 70 weight percent, preferably 20 to 50 weight percent, based on the weight of the aromatic polyisocyanates or mixtures of aromatic polyisocyanates.

Melamine has also been used as an additive to the foam forming components of other foams, such as polyester polyurethane foams and rigid foams.

U.S. Pat. No. 4,317,889 discloses flexible, resilient polyester polyurethane foams with substantially improved charforming or intumescent properties, obtained by adding to a conventional polyester polyurethane foam forming reaction mixture at least one melamine derivative, at least one flame retardant, and hydrated alumina. The amount of melamine derivative generally ranges from about 10 to 30 parts by weight based on 100 parts by weight of the polyester polyol.

Also, U.S. Pat. No. 3,897,372 discloses polyurethane foam compositions having flame retardancy and reduced smoke density formed by reacting specific polyisocyanate capped polyoxethylene glycol resin reactants with water. Melamine is added to these foam-forming compositions in an amount of between 1 and 200 parts by weight based on 100 parts by weight of the resin reactant, along with between 50 and 400 parts by weight of aluminum hydrate.

Rigid polyurethane foams which include melamine powder in an amount of between 20 and 100 parts by weight based on the weight of the polyhydroxyl compound are described in U.S. Pat. No. 4,221,875. Also, West German Patent No. 2,348,838 discloses a method for flameproofing synthetic polyurethane materials by adding to a mixture of polyisocyanates, catalysts, polyols, foaming agents, and auxiliary agents, melamine as a flameproofing agent in an amount of between 2.5 and 50% by weight based on the total weight of the reaction mixture.

Rebond polyurethane foam compositions having melamine or urea incorporated therein are described in U.S. Pat. No. 4,385,131. These additives are included in an amount of between about 40 to 100 parts per 100 parts of polyurethane foam chips. The additives and foam chips are joined by a liquid binder to form flame retardant rebond foam articles.

U.S. Pat. No. 3,726,835 discloses that melamine or dicyandiamide can be utilized as a stabilizer for polyurethane prepolymers which are thereafter cured to form elastomeric polymers. In these compositions, 10 parts melamine or dicyandiamide is added to 100 parts prepolymer.

Post-curing of polyether derived foam by exposure to a mixture of water vapor and gaseous ammonia, primary or secondary amines at temperatures of about 50° to 150° F. for a period of at least one minute is disclosed in U.S. Pat. No. 4,537,912. While this process effectively and rapidly cures the foam, it constitutes an additional step beyond those normally used in the foam manufacturing process. This process also requires storage of the foam prior to the postcuring treatment. It is more desirable to cure the foam as it is manufactured to reduce or even eliminate such storage time and to prepare a fully cured foam material which can be immediately shipped to the end users after cutting to the desired shapes.

None of these references disclose the possibility of using melamine or melamine derivatives for rapidly curing polyether polyurethane foam while concommittantly improving the compression set properties.

The present invention provides a one-step foaming and curing process which achieves a rapid and full post cure of the foam so that low compression set values as measured by ASTM standard test D-3574 (Constant Deflection Compression Set Test) are obtained, with the elimination of post curing steps.

SUMMARY OF THE INVENTION

The present invention relates to a flexible polyurethane foam forming composition comprising a polyether polyol; an organic isocyanate compound; water; and a curing agent, preferably melamine, in an effective amount to rapidly cure the resultant foam and improve the compression set properties of the foam and up to about 4 parts by weight of the curing agent based on 100 parts by weight of the polyether polyol.

Another embodiment of the invention relates to a method for rapidly curing and decreasing the compression set properties of a polyurethane foam which comprises adding a curing agent, again preferably of melamine, to a polyurethane foam-forming composition containing a polyether polyol, an organic isocyanate compound, and water, the curing agent being added in an amount sufficient to rapidly cure the resultant foam and improve the compression set properties and up to about 4 parts by weight based on 100 parts by weight of the polyether polyol, and thereafter forming the polyurethane foam from the foam-forming composition.

DETAILED DESCRIPTION OF THE INVENTION

The objectives of this invention are accomplished by incorporating into the foam forming components of a flexible polyether polyurethane foam composition a small amount of a curing agent, preferably of melamine. Then, during the foam-forming reaction, the melamine rapidly cures the foam, i.e., improves the resulting compression set properties of the foam.

The term "polyether polyurethane" as used throughout this application refers to polyurethanes derived by polyether polyols. This class would include the poly(oxytetramethylene) glycols which are prepared by the polymerization of tetrahydrofuran. Poly(oxypropylene) triols are another important group of polyethers used in the manufacture of polyurethanes which are included in this class. These triols are prepared by the same general reactions as poly (oxypropylene) glycols. The polyurethanes derived from polyesters do not normally present post-curing problems and thus do not form part of this invention.

The term "organic isocyanate compound" is used to describe the isocyanate or polyisocyanate compounds that are suitable for use in this invention. Such organic isocyanate compounds include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3-dimethoxy-4,4'-biphenyl diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred crude isocyanates are disclosed in U.S. Pat. No. 3,215,652.

The polyurethane foams employed in the present invention are generally prepared by the reaction of the polyether polyol with the organic isocyanate compound in the presence of a blowing agent, i.e., water and, optionally, in the presence of additional polyhydroxyl-containing components, chain-extending agents, catalysts, surface-active agents, stabilizers, dyes, fillers and pigments. The preparation of cellular polyurethane plastic foam is well known in the art. Corresponding quantities of excess isocyanate compound are used to react with the water, producing carbon dioxide.

It is also possible to proceed with the preparation of the polyurethane by a prepolymer technique wherein an excess of the organic isocyanate compound is reacted in a first step with the polyol of the present invention to prepare a prepolymer having free isocyanate groups which is then reacted in a second step with water and/or additional polyols to prepare a foam. Alternatively, the components may be reacted in a single working step commonly known as the "one-shot" technique of preparing polyurethanes.

Flexible, one shot polyurethane foam is formed by two principal reactions:

1. The reaction of hydroxyl groups in a polymeric polyol with an isocyanate group to form a urethane linkage. Because of difunctional isocyanates, oligomers are formed. As the reaction proceeds, the viscosity increases to a point that the mixture is said to have "creamed".

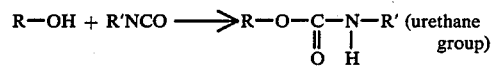

2. Water reacts with an isocyanate group to form an unstable carbamic acid. The acid decomposes to generate $CO_2$ and an amine. The amine in turn reacts with an isocyanate to form a urea group.

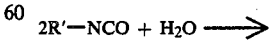

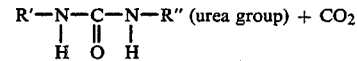

The presence of excess isocyanate groups in the formulation promotes cross-linking by reacting with the previously formed urethane and urea linkages to form allophonates and biurets This begins to occur at about 80° C. While the use of excess isocyanate is important for stabilizing the foam as it forms and improving physical properties, this excess can also lead to isocyanate groups being physically trapped within the matrix after foam formation. As the —OH's and —NH's are consumed by the reaction, those remaining biurets and allophonates also became fixed in some locations. The result is that unreacted isocyanate groups remain in the foam.

Poor compression sets are said to result when unreacted isocyanate groups on a cell wall are forced by compression against another wall. If these isocyanate groups react when compressed, the deformation is permanent; hence, poor compression set properties of the foam are obtained.

The problem then becomes how to provide enough isocyanate to form the foam without also obtaining poor compression set properties. Two solutions are known.

1. Atmospheric moisture, which is always present in the foam slab, can eventually react with the excess isocyanate groups. This moisture is present primarily due to diffusion of the humidity from the atmosphere, while some moisture may be present due to the use of excess water in the foam forming ingredients. Whatever the source, this moisture is available in the foam for reaction with the excess isocyanate. Because of the size of the foam slab and the uncooperativeness of nature in providing reliable relative humidity, this reaction can take three days to six weeks and is not a practical solution. In addition, it is not possible to predict when the reaction is substantially complete, so the foam must be tested periodically with a test that takes 24 hours.

2. The forced cure process described in U.S. Pat. No. 4,537,912 can be used: ammonia and moisture vapor are brought to the isocyanate to effect an essentially instant cure. While this extra processing adds to the cost of the foam and presents logistical problems, it at least makes it possible to plan on reliable compression set properties while eliminating the need for excessive storage areas for holding the foam as it cures.

We have now discovered that it is indeed possible to use high enough isocyanate indices for foam formation and still not interfere with rapidly obtaining good compression sets. Melamine powder, added in small amounts into the polyol provides an inexpensive solution. Melamine is easy to disperse, does not react with the foam-forming components, does not interfere with the foaming process, and does not detract from the physical properties of the foam. In fact, melamine even marginally improves the physical properties of the foam and provides some flame retardant properties as well.

Melamine appears to work very much like ammonia, i.e., as a catalyst for the reaction of the remaining isocyanate groups with the moisture that is present in the foam. On the surface, melamine appears quite different. It is a white crystalline powder which melts at 350° C. and dissociates at 610° C. It has very little solubility in most common solvents. In comparison, ammonia, a gas, is much more basic than melamine and has less steric hindrance, so would be a much stronger catalyst.

Because of the high reactivity of ammonia, it cannot be introduced to the foam until the chemistry is essentially complete. It cannot be added to the formulation and, in fact, cannot be introduced until the foam is several hours old. When it is introduced with moisture, it catalyzes the almost instantaneous reaction of the remaining isocyanate groups with water.

Melamine is a weak base having more steric hindrance than ammonia. It is essentially insoluble in both the starting ingredients and the foam. This would suggest that the reaction with isocyanate would be very slow and that its catalytic effect would be weaker than ammonia. Because of this, melamine can be added to the foam forming ingredients. There also appears to be no effect on cream time. As the temperature rises there appears to be some effect on the rate of rise. This shortening of rise time is an indication that the water/isocyanate reaction is being catalyzed. When the rise is complete, the unreacted isocyanate appears to be at least partially complexed by melamine. As the gases in the open cell foam are exchanged with the atmosphere, the moisture in the humidity of the surrounding air enters the bun. This moisture finds the reactive complex and reacts to eliminate the isocyanate group, thus removing this source of poor compression set properties.

The actual reaction with isocyanate appears to be mostly restricted to this intermediate complex. There is evidence, both factory and laboratory, that melamine is not becoming permanently involved in the polymer formation.

As noted above, the curing agent is added to the form-forming composition to cure the foam immediately after foam formation so that greatly improved (i.e. lower) compression set values are obtained, as determined according to ASTM test method D-3574.

The most preferred curing agent is melamine in the form of a powder, and any amounts in the range of about 0.1 to 4 parts by weight and preferably between 1 and 2 parts by weight based on 100 parts by weight of polyether polyol are suitable. Amounts higher than 4 parts by weight based on 100 parts by weight of polyol do not improve and, in fact, detrimentally affect the compression set properties of the resulting foam and therefore should not be used.

The particle size of the melamine powder is not critical and any particle size ranges between 1 and 100 microns is suitable. Two standard melamine powders, have been found to be suitable: Pluragard ® melamine powder by BASF, which has a particle size distribution of 60% of less than 44 microns, and finely ground melamine powder by MCI, which has a particle size distribution of 90% less than 10 microns.

In addition to melamine, other curing agents having as an active moeity an amine or hydroxyl group are also useful; however, the active moeity must not enter into the early stages of the foam forming reaction. This can be determined in the compound by its basic nature. The specific requirements for suitable curing agents are:

1. a reactive moeity in the form of primary or secondary amine, or an alcohol, or the melamine structure;
2. a dissociation constant of between about $1.8 \times 10^{-5}$ and $2.5 \times 10^{-12}$; and
3. insolubility and/or immiscibility of the compound in the reaction media; i.e., the foam-forming components.

Therefore, predictability of success of the compound is limited to knowing its dissociation constant, its Lewis base strength and how available the moeity is for reaction with the isocyanate. At the same base strength or dissociation constant, soluble materials will react fast, miscible materials (liquids) rapidly and insoluble solids very slowly.

For example, aniline is a weaker base than melamine. However, it is a liquid that either dissolves or mixes with the preferred isocyanate, TDI. Aniline provides a rapid cure, but if sufficient aniline enters the foam reaction early enough, it can interfere with the polymerization process. As a result the physical properties of the foam will suffer.

In accordance with the preceding, additional curing agents include cyanuric acid, 2,6-diaminopyridine, dicyandiamide, formamide, 2-hydroxy benzimidazole, 3-amino-1,2,4-triazole, hypoxanthine, caprolactam, 3-amino-1,2,4-triazine, 4,4,-methylene dianiline and aniline, and these are contemplated as being within the scope of the present invention.

It is believed that melamine derivatives having the basicity values described above and which are relatively insoluble in the foam-forming components or which do not affect the foam forming reaction should help cure the foam while also providing improvement to the resulting compression set values when used in the above-stated ranges. Thus, such melamine derivatives are contemplated as being within the scope of this invention.

As noted above, due to its relatively low cost and availability, melamine powder is the most preferred additive. While a single curing agent is added for ease of formulation of the foam, it is understood that two or more of these agents may be used in combination, and such combinations are contemplated by this invention.

Other additives for forming the foam which may be incorporated into these form foaming compositions are well known to those skilled in the art, and would include, for example, catalysts, chain extending agents, surfactants or surface active agents, and/or flame retardant additives.

Suitable flame retardants for use in the composition of the invention include those which are conventionally used in the art of making flexible, flame retardant polyurethane foams, such as tri-esters of phosphoric acid, halogenated triesters of phosphoric acid, halogenated hydrocarbons, and the like.

Specific examples of such suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, tris(2-chloroprophyl)phosphate, bis(dichloropropyl) tribromoneopentyl phosphate, tetrakis(2-chloroethyl) ethylene diphosphate (sold by Olin Chemicals as THERMOLIN® 101), FYROL® EFF(oligomeric chloroalkyl phosphate, sold by Stauffer Chemical Co.), tricresyl phosphate, cresyl diphenyl phosphate, chlorinated paraffin, and brominated paraffin. Halogenated phosphates are generally preferred as flame retardant additives in polyether polyurethane foams of the invention, especially tris(1,3-dichloropropyl)phosphate, tris(2-chloroethyl)phosphate, FYROL® EFF, and tetrakis(2-chloroethyl)ethylene diphosphate, with the first and last-named being particularly preferred.

It is also possible to utilize in this invention liquid flame retardants similar to those described above but which also contain reactive hydroxyl groups in their structure, such as Vircol 82.

Although a single flame retardant is preferred from the standpoint of simplicity of formulation, mixtures of two or more of the same type or of different types may be found to give improved performance in some cases, and such mixtures may be included in the foams of this invention. The amount of flame retardant additive or mixture can be varied over a wide range, from about 8 to about 60 parts by weight per 100 parts by weight of polyol in the foam forming compositon. It is preferred to use from about 8 to about 20 parts by weight.

Chain-extending agents which may be employed in the preparation of the polyurethane foams of the invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl) ethylenediamine, N'N-di(2-dydroxypropyl)ethylenediamine, piperazine, and 2-methylpiperazine.

Any suitable catalyst or combination of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts include, for example, stannous octoate, stannous chloride, dibutyltin di-2-ethyl hexanoate, stannous oxide, as well as other organometallic compounds such as are disclosed in U.S. Pat. No. 2,846,408.

A surfactant or surface-active agent is generally necessary for production of high grade polyurethane foam according to the present invention, since in the absence of same, the foams may collapse or contain very large uneven cells. Numerous surface-active agents have been found satisfactory, with nonionic surface active agents being preferred. Of these, the well-known silicones have been found to be particularly advantageous. Other surface-active agents which are operative, include polyethylene glycol ethers of long chain alcohols, tertiary amine or alkanolamine salts of long chain alkyl acid sulfate esters, alkyl sulfonic esters, and alkyl arylsulfonic acids.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified, while the density values are reported in pounds per cubic feet, the porosity values in cubic decimeters per second and the compression set values in percent loss as defined in ASTM D-3574. Also, unless noted otherwise, all references to melamine powder refer to the BASF Pluragard® material described above.

EXAMPLE 1

(Comparative)

Three control samples were prepared from the following formulation:

| Component | parts by weight |
|---|---|
| polyether polyol* (3000 mw) | 100.0 |
| toluene diisocyanate (80/20) | 49.7 |
| water | 4.0 |
| stannous octoate catalyst | 0.27 |
| silicone surfactant | 1.0 |
| amine catalyst | 0.4 |
| conventional fire retardant additives | 8.0 |

*Polyol 3010 from Dow Chemical

Six samples were prepared at 70° F., three were allowed to age for 24 hours and three were aged for one week. The following properties (averaged from the samples) were measured:

| Property | Value |
|---|---|
| compression set (24 hours) | 30.7 |
| compression set (1 week) | 8.9 |
| porosity | 4.2 |
| density | 1.59 |

EXAMPLES 2-8

To the control formulation, 0.25, 0.5, 1, 2, 3, 4 and 5 parts melamine powder, respectively, were added to prepare the foams of Examples 2-8. Three samples of each foam were prepared and tested in the same manner as in Example 1. Results averaged from three samples of each Example were as follows:

| Property | Value of Example | | | | | | |
|---|---|---|---|---|---|---|---|
| | 2 | 3 | 4 | 5 | 6 | 7 | 8 |
| compression set (24 hours) | 20.7 | 21.4 | 8.4 | 8.0 | 9.2 | 13.5 | 32.1 |
| compression set (1 week) | 8.6 | 8.5 | 8.2 | 8.2 | 9.1 | 12.7 | 27.4 |
| porosity | 4.4 | 4.0 | 4.4 | 4.5 | 4.2 | 4.1 | 4.5 |
| density | 1.61 | 1.60 | 1.61 | 1.61 | 1.62 | 1.63 | 1.64 |

The results show improvement over the control for Examples 2-7, with maximum efficiency for the addition of 1 to 2 parts melamine powder (Examples 4-5). Also, the addition of 5 parts melamine powder gave worse compression set results than the control without melamine powder.

EXAMPLE 9

(Comparative)

Nine control samples (A through I) were prepared from the following formulation:

| Component | parts by weight |
|---|---|
| polyether polyol* (3000 mw) | 100.0 |
| toluene diisocyanate (80/20) | 49.7 |
| water | 4.0 |
| stannous octoate catalyst | 0.27 |
| silicone surfactant | 1.0 |
| amine catalyst | 0.35 |
| conventional fire retardant additives | 8.21 |

*Polyol 3010 from Dow Chemical

Foam samples were prepared at ambient temperature (i.e., 74°-78° F.), and the following properties were measured:

| Property | A | B | C | D | E | F | G | H | I | Average |
|---|---|---|---|---|---|---|---|---|---|---|
| Density | 1.62 | 1.63 | 1.61 | 1.55 | 1.58 | 1.61 | 1.62 | 1.57 | 1.60 | 1.60 |
| Porosity | 5.2 | 4.6 | 4.8 | 4.4 | 3.7 | 3.6 | 3.1 | 4.6 | 3.9 | 4.2 |
| Compression Set | 87.8 | 87.4 | 86.3 | 81.7 | 86.6 | 82.4 | 87.4 | 85.9 | 84.3 | 85.5 |

These properties were determined from the middle section of foam samples which were wrapped while aging. The properties of foam sample A properties were determined 3 hours after foam formation, foam samples B and C at 4 hours, and the remaining foam samples at 2.5 hours.

EXAMPLE 10

To the control formulation of Example 9, 1.8 parts of melamine powder were added to prepare nine foam samples (J through R). These samples were prepared at temperatures between 74° and 78° F., and the following properties were measured.

| Property | Example | | | | | | | | | Average |
|---|---|---|---|---|---|---|---|---|---|---|
| | J | K | L | M | N | O | P | Q | R | |
| Density | 1.56 | 1.52 | 1.54 | 1.63 | 1.53 | 1.59 | 1.57 | 1.50 | 1.53 | 1.55 |
| Porosity | 5.2 | 5.4 | 5.2 | 5.3 | 5.1 | 4.1 | 4.2 | 5.9 | 4.9 | 5.0 |
| Compression Set | 6.0 | 4.5 | 4.7 | 4.3 | 3.3 | 5.6 | 4.2 | 5.2 | 5.1 | 4.8 |

The properties of foam sample J were measured 3 hours after foam formation, the properties of foam samples K and L were measured at 4 hours, while the remaining foam samples were tested at 2.5 hours.

These data show that, at an addition of about 1.8 parts melamine powder, optimum properties are obtained.

EXAMPLE 11

(Comparative)

Another foam formulation was prepared as follows:

| Component | parts by weight |
|---|---|
| polyether polyol* (3000 mw) | 100.0 |
| toluene diisocyanate (80/20) | 49.7 |
| water | 4.0 |
| stannous octoate catalyst | 0.25 |
| silicone surfactant | 1.1 |
| amine catalyst | 0.28 |

| Component | parts by weight |
|---|---|
| conventional fire retardant additives | 8.21 |

*Polyol 3010 from Dow Chemical

A foam sample was prepared at 70° F. and the following properties were measured three hours after foam formation from the middle section of the sample.

| Property | Value |
|---|---|
| Density | 1.65 |
| Porosity | 4.2 |
| Compression Set | 77.4 |

EXAMPLE 12

To the formulation of Example 11, 1.8 parts melamine powder were added. The foam was formed at 70° F. and the following properties were determined under the same conditions as Example 11.

| Property | Value |
|---|---|
| Density | 1.59 |
| Porosity | 4.7 |
| Compression Set | 5.7 |

EXAMPLES 13-26

(Comparative)

Four control samples were prepared from the following formulation:

| Component | parts by weight |
|---|---|
| polyether polyol* (3000 mw) | 100.0 |
| toluene diisocyanate (80/20) | 49.7 |
| water | 4.0 |
| silicone surfactant | 1.0 |
| amine catalyst | 0.35 |
| stannous octoate catalyst | 0.28 |
| conventional fire retardant additives | 8.0 |

*Polyol 3010 from Dow Chemical

For Examples 13, 14 and 17 through 26, an amine catalyst in an amount of 0.35, a stannous octoate catalyst in an amount of between 0.25 and 0.28 and conventional fire retardant additives in an amount of 8.21 parts were added, while Examples 15 and 16 utilized 8.0 parts conventional fire retardant additive, 0.32 parts of the amine catalyst and 0.46 parts of the stannous octoate catalyst. Foams were prepared at ambient temperatures (i.e., 66°-76° F.), and the following properties were measured from a sample taken from the middle of the foam 2.5 hours after aging.

| Example | Property | | |
|---|---|---|---|
| | Density | Porosity | Compression Set |
| 13 | 1.53 | 2.2 | 79.7 |
| 14 | 1.58 | 2.9 | 79.4 |
| 15 | 1.62 | 4.2 | 87.0 |
| 16 | 1.57 | 4.6 | 86.7 |
| 17 | 1.52 | 3.1 | 78.1 |
| 18 | 1.57 | 3.0 | 85.2 |
| 19 | 1.55 | 2.6 | 85.3 |
| 20 | 1.61 | 3.1 | 82.5 |
| 21 | 1.59 | 3.1 | 80.5 |
| 22 | 1.59 | 3.2 | 78.5 |
| 23 | 1.54 | 4.2 | 78.4 |
| 24 | 1.57 | 3.8 | 85.2 |
| 25 | 1.60 | 2.8 | 82.8 |
| 26 | 1.57 | 2.2 | 86.3 |
| Average | 1.57 | 3.2 | 83.3 |

EXAMPLES 27-30

To the control formulations of Examples 13 and 14, 1.8 parts of caprolactam were added to prepare the foams of Examples 27 and 28, respectively, and 1.8 parts of melamine powder were to prepare the foams of Examples 29 and 30, respectively. These samples were prepared at 73° F. and the following properties were measured from the middle section of the foams after aging for 2.5 hours.

| Property | Example | | | |
|---|---|---|---|---|
| | 27 | 28 | 29 | 30 |
| Density | 1.72 | 1.65 | 1.50 | 1.54 |
| Porosity | 3.0 | 3.2 | 3.2 | 3.1 |
| Compression Set | 6.5 | 7.6 | 4.9 | 4.6 |

EXAMPLES 31-36

To the control formulations of Examples 15, 16 and 17, 1.8 parts of anililne were added to prepare the foams of Examples 31, 32 and 33, respectively, while 1.8 parts of melamine powder were added to prepare the foams of Examples 34, 35 and 36, respectively. Each of the cyanuric acid and melamine containing foams were prepared at 66°, 75° and 76° F., respectively, and the following properties were again measured 2.5 hours after foam formation from a middle section of the foam as in the preceding examples.

| Property | Example | | | | | |
|---|---|---|---|---|---|---|
| | 31 | 32 | 33 | 34 | 35 | 36 |
| Density | 1.54 | 1.49 | 1.51 | 1.56 | 1.59 | 1.49 |
| Porosity | 5.6 | 5.7 | 5.0 | 5.8 | 5.6 | 5.0 |
| Compression Set | 3.5 | 4.2 | 5.1 | 3.3 | 4.5 | 5.5 |

EXAMPLES 37-42

To the control formulations of Examples 18, 19 and 20, 1.8 parts of 2-6 diaminopyridine were added to prepare the foams of Examples 37-39, respectively, while 1.8 parts melamine powder were added to the same control formulations to form the foams of Examples 40-42, respectively. Each of the 2-6 diaminopyridine and melamine containing foams were prepared at 66°, 76° and 73° F., respectively and the following properties were measured 2.5 hours after foam formation from a middle section of each foam as in the preceding examples.

| Property | Example | | | | | |
|---|---|---|---|---|---|---|
| | 37 | 38 | 39 | 40 | 41 | 42 |
| Density | 1.50 | 1.53 | 1.51 | 1.49 | 1.55 | 1.57 |
| Porosity | 4.3 | 1.7 | 3.1 | 6.7 | 3.6 | 4.5 |

-continued

| Property | Example | | | | | |
|---|---|---|---|---|---|---|
| | 37 | 38 | 39 | 40 | 41 | 42 |
| Compression Set | 9.2 | 44.0 | 14.6 | 4.8 | 3.5 | 4.8 |

EXAMPLES 43–48

To the control formulations of Examples 21, 22 and 23, 1.8 parts of dicyandiamide were added to prepare the foams of Examples 43–45, respectively, while 1.8 parts melamine powder were added to the same control formulations to form the foams of Examples 40–42, respectively. These foams were prepared at 73° F. and the following properties were measured as in the preceding examples:

| Property | Example | | | | | |
|---|---|---|---|---|---|---|
| | 43 | 44 | 45 | 46 | 47 | 48 |
| Density | 1.51 | 1.52 | 1.51 | 1.56 | 1.57 | 1.55 |
| Porosity | 2.9 | 2.8 | 2.9 | 4.4 | 4.1 | 4.1 |
| Compression Set | 6.5 | 6.5 | 7.9 | 4.7 | 3.2 | 3.9 |

EXAMPLES 49–52

To the control formulations of Examples 20 and 24, 1.8 parts of the Pluargard ® melamine powder, were added to prepare the foams of Examples 49–50, respectively, while 1.8 parts finely ground melamine powder, (particle size 90% less than 10 microns) were added to prepare the foams of Examples 51–52, respectively. Each of the large and small particle size melamine containing foams were prepared at 66° and 73° F., respectively, and the following properties were measured as in the preceding examples.

| Property | Example | | | |
|---|---|---|---|---|
| | 49 | 50 | 51 | 52 |
| Density | 1.61 | 1.57 | 1.51 | 1.55 |
| Porosity | 5.5 | 4.5 | 5.0 | 5.2 |
| Compression Set | 3.6 | 4.8 | 4.0 | 4.9 |

The data shows essentially no difference for the use of fine or standard particle size melamine powder in these foams.

EXAMPLES 53–56

To the control formulations of Examples 25 and 26, 1.8 parts of formamide were added to prepare the foams of Examples 53–54, respectively, while 1.8 parts melamine powder were added to prepare the foams of Examples 55–56, respectively. These samples were prepared at 73° F. and the following properties were measured as in the preceding examples.

| Property | Example | | | |
|---|---|---|---|---|
| | 53 | 54 | 55 | 56 |
| Density | 1.69 | 1.64 | 1.52 | 1.57 |
| Porosity | 3.1 | 2.7 | 3.3 | 2.8 |
| Compression Set | 6.0 | 5.4 | 4.2 | 4.9 |

EXAMPLES 57–60

To the control formulations of Examples 25 and 26, 1.8 parts of 2-hydroxy benzimidazole were added to prepare the foams of Examples 57–58, respectively, while 1.8 parts melamine powder were added to prepare the foams of Examples 59–60, respectively. These samples were prepared at 73° F. and the following properties were measured as in the preceding examples.

| Property | Example | | | |
|---|---|---|---|---|
| | 57 | 58 | 59 | 60 |
| Density | 1.58 | 1.59 | 1.52 | 1.57 |
| Porosity | 3.5 | 2.9 | 3.3 | 2.8 |
| Compression Set | 5.9 | 6.5 | 4.2 | 4.9 |

EXAMPLES 61–66

To the control formulations of Examples 16, 17 and 19, 1.8 parts of hypoxanthine were used to prepare the foams of Examples 61–63, respectively, while to the same control formulations, 1.8 parts melamine powder were added to prepare the foams of Examples 64–66, respectively. These foams were prepared at 75°–76° F. and the following properties were measured as in the preceding examples.

| Property | Example | | | | | |
|---|---|---|---|---|---|---|
| | 61 | 62 | 63 | 64 | 65 | 66 |
| Density | 1.52 | 1.59 | 1.55 | 1.59 | 1.49 | 1.55 |
| Porosity | 5.1 | 4.9 | 3.6 | 5.6 | 5.0 | 3.6 |
| Compression Set | 3.8 | 4.9 | 4.6 | 4.6 | 5.5 | 3.5 |

EXAMPLES 67–70

(Comparative)

Four control samples were prepared from the following formulation:

| Component | parts by weight |
|---|---|
| polyether polyol* (3000 mw) | 100.0 |
| toluene diisocyanate (80/20) | 49.7 |
| water | 4.0 |
| silicone surfactant | 1.0 |
| amine catalyst | 0.35 |
| stannous octoate catalyst | 0.28 |
| conventional fire retardant additives | 8.0 |

*Polyol 3010 from Dow Chemical

Foams were prepared at ambient temperatures (i.e., 73°–74° F.), and the following properties were measured from a sample taken from the middle of the foam 2.5 hours after aging.

| Example | Property | | |
|---|---|---|---|
| | Density | Porosity | Compression Set |
| 67 | 1.58 | 3.1 | 85.4 |
| 68 | 1.55 | 3.2 | 84.2 |
| 69 | 1.50 | 3.1 | 81.4 |
| 70 | 1.58 | 3.0 | 70.4 |
| Average | 1.55 | 3.1 | 80.4 |

EXAMPLES 71–74

To the control formulations of Examples 67 and 68, 1.8 parts of 3-amino-1,2,4-triazine were added to prepare the foams of Examples 71 and 72, respectively, and 1.8 parts of melamine powder were added to prepare the foams of Examples 73 and 74, respectively. These samples were prepared at 73° F. and the following properties were measured from the middle section of the foams after aging for 2.5 hours.

| Property | Example | | | |
|---|---|---|---|---|
| | 67 | 68 | 69 | 70 |
| Density | 1.52 | 1.55 | 1.57 | 1.55 |
| Porosity | 5.1 | 3.4 | 4.1 | 3.9 |
| Compression Set | 4.6 | 4.4 | 5.2 | 3.56 |

EXAMPLES 75–78

To the control formulations of Examples 69, and 70, 1.8 parts of aniline were added to prepare the foams of Examples 75 and 76, respectively, while 1.8 parts of melamine powder were added to prepare the foams of Examples 77 and 78, respectively. The foams of Examples 75 and 77 were prepared at 74° F., while the foams of Examples 76 and 78 were prepared at 75° F., with the following properties measured 2.5 hours after foam formation from a middle section of the foam as in the preceding examples.

| Property | Example | | | |
|---|---|---|---|---|
| | 75 | 76 | 77 | 78 |
| Density | 1.59 | 1.58 | 1.54 | 1.51 |
| Porosity | 3.8 | 4.0 | 3.9 | 2.9 |
| Compression Set | 5.6 | 5.7 | 3.8 | 4.7 |

These examples illustrate the improvement in the compression set of the foam by the addition of melamine or melamine equivalent compared to the control samples without these additives.

While it is apparent that the invention herein disclosed is well calculated to fulfill the desired results, it will be appreciated that numerous modifications and embodiments may be devised by those skilled in the art, and it is intended that the appended claims cover all such modifications and embodiments as fall within the true spirit and scope of the present invention.

What is claimed is:

1. A flexible, non-hydrophilic, polyether derived polyurethane foam forming composition comprising a polyether polyol, an organic isocyanate compound, water in an amount effective to act as a blowing agent, and a curing agent of an organic compound having at least one amine or hydroxyl moiety and a dissociation constant of between about $1.8 \times 10^{-5}$ and $2.5 \times 10^{-12}$ and which is substantially non-reactive with the foam forming components but which acts as a catalyst to the reaction of remaining isocyanate groups with moisture in the foam after formation thereof, said curing agent added in an amount effective to cause the reaction of a sufficient number of said remaining isocyanate groups with said moisture to improve the compression set properties of the resulting flexible foam but less than 5 parts by weight based on 100 parts by weight of the polyether polyol.

2. The composition of claim 1 where the curing agent is melamine in an amount of less than about 4 parts by weight based on 100 parts by weight of the polyether polyol.

3. The composition of claim 2 wherein the amount of melamine is between about 1 and 2 parts by weight based on 100 parts by weight of the polyether polyol.

4. The composition of claim 1 wherein the curing agent is cyanuric acid, 2,6-diamino pyridine, dicyandiamide, formamide, 2-hydroxy benzimidazole, 3-amino-1,2,4-triazole, hypoxanthine, caprolactam, 3-amino-1,2,4-triazine, 4,4'-methylene dianiline, aniline, or mixtures thereof in an amount of less than about 4 parts by weight based on 100 parts by weight of the polyether polyol.

5. The composition of claim 4 wherein the amount of curing agent ranges from between about 1 and 2 parts by weight based on 100 parts by weight of the polyether polyol.

6. A flexible polyether derived polyurethane foam forming composition comprising a polyether polyol; an organic isocyanate compound; water; and melamine in an amount of between about 0.25 and 4 parts by weight based on 100 parts by weight of the polyether polyol to rapidly cure the resultant foam and concommittantly to improve the compression set properties of the foam.

7. The composition of claim 6 wherein the amount of melamine is between about 1 and 2 parts by weight based on 100 parts by weight of the polyether polyol.

8. A flexible polyether-derived polyurethane foam forming composition comprising a polyether polyol; an organic isocyanate compound, water, and a curing agent of cyanuric acid, 2,6-diamino pyridine, dicyandiamide, formamide, 2-hydroxy benzimidazole, 3-amino-1,2,4-triazole, hypoxanthine, caprolactam, 3-amino-1,2,4-triazine, 4,4'-methylene dianiline, aniline or mixtures thereof in an amount of between about 0.25 and 4 parts by weight based on 100 parts by weight of the polyether polyol to rapidly cure the resultant foam and concomittantly to improve the compression set properties of the foam.

9. The composition of claim 8 wherein the amount of the curing agent is between about 1 and 2 parts by weight based on 100 parts by weight of the polyether polyol.

10. In a flexible, non-hydrophilic polyurethane foam formed from a foam-forming composition which includes a polyether polyol, an organic isocyanate compound and water in an amount effective to act as a blowing agent, the improvement which comprises including in said foam-forming composition a curing agent of an organic compound having at least one amine or hydroxyl moeity and a dissociation constant of between about $1.8 \times 10^{-5}$ and $2.5 \times 10^{-12}$ and which is substantially non-reactive with the foam forming components but which acts as a catalyst to the reaction of remaining isocyanate groups with moisture in the foam after formation thereof, said curing agent being present in an amount effective to cause the reaction of a sufficient number of said remaining isocyanate groups with moisture in the foam to rapidly cure and improve the compression set properties of the resultant flexible polyurethane foam but less than 5 parts by weight based on 100 parts by weight of the polyether polyol.

11. The foam of claim 10 wherein the curing agent is melamine in an amount of between about 0.25 and 4 parts by weight based on 100 parts by weight of the polyether polyol.

12. The foam of claim 10 wherein the curing agent is melamine in an amount of between about 1 and 2 parts by weight based on 100 parts by weight of the polyether polyol.

13. The foam of claim 10 wherein the curing agent is cyanuric acid, 2,6-diamino pyridine, dicyandiamide, formamide, 2-hydroxy benzimidazole, 3-amino-1,2,4-triazole, hypoxanthine, caprolactam, 3-amino-1,2,4-triazine, 4,4'-methylene dianiline, aniline, or mixtures thereof in an amount of between about 0.25 and 4 parts by weight based on 100 parts by weight of the polyether polyol.

14. The foam of claim 10 wherein the curing agent is cyanuric acid, 2,6-diamino pyridine, dicyandiamide, formamide, 2-hydroxy benzimidazole, 3-amino-1,2,4-triazole, hypoxanthine, caprolactam, 3-amino-1,2,4-triazine, 4,4'-methylene dianiline, aniline, or mixtures thereof in an amount of between about 1 and 2 parts by weight based on 100 parts by weight of the polyether polyol.

15. In a flexible polyurethane foam formed from a foam-forming composition which includes a polyether polyol, an organic isocyanate compound, and water, the improvement which comprises including a curing agent of melamine in the foam-forming composition in an amount effective cause the reaction of a sufficient number of remaining isocyanate groups with moisture in the foam to rapidly cure and to improve the compression set properties of the resultant flexible polyurethane foam up to about 4 parts by weight based on 100 parts by weight of the polyether polyol.

16. The foam of claim 15 wherein the amount of melamine is between about 1 and 2 parts by weight based on 100 parts by weight of the polyether polyol.

17. In a flexible polyurethane foam formed from a foam-forming composition which includes a polyether polyol, an organic isocyanate compound, and water, the improvement which comprises including a curing agent of cyanuric acid, 2,6-diamino pyridine, dicyandiamide, formamide, 2-hydroxy benzimidazole, 3-amino-1,2,4-triazole, hypoxanthine, caprolactam, 3-amino-1,2,4-triazine, 4,4'-methylene dianiline, aniline, or mixtures thereof in the foam-forming composition in an amount effective cause the reaction of a sufficient number of remaining isocyanate groups with moisture in the foam to rapidly cure and to improve the compression set properties of the resultant flexible polyurethane foam up to about 4 parts by weight based on 100 parts by weight of the polyether polyol.

18. The foam of claim 17 wherein the amount of curing agent is between about 1 and 2 parts by weight based on 100 parts by weight of the polyether polyol.

19. A method for rapidly curing and improving the compression set properties of a flexible, non-hydrophilic, polyether derived polyurethane foam which comprises:
adding to a polyurethane foam-forming composition containing a polyether polyol, an organic isocyanate compound, and water in an amount effective to act as a blowing agent, a curing agent of an organic compound having at least one amine or hydroxyl moeity and a dissociation constant of between about $1.8 \times 10^{-5}$ and $2.5 \times 10^{-12}$ which is substantially non-reactive with the foam forming components but which acts as a catalyst to the reaction of remaining isocyanate groups with moisture in the foam after formation thereof, said curing agent added in an amount effective to cause the rapid reaction of a sufficient number of said remaining isocyanate groups with said moisture to rapidly cure the resultant foam and improve the compression set properties thereof but less than 5 parts by weight based on 100 parts by weight of the polyether polyol; and
forming the polyurethane foam from said foam-forming composition, whereby said curing agent cures substantially all the resultant foam.

20. The method of claim 19 wherein the curing agent is present in an amount ranging from between about 0.25 and 4 parts by weight based on 100 parts by weight of the polyether polyol.

21. The method of claim 20 wherein the amount of curing agent ranges from between about 1 and 2 parts by weight based on 100 parts by weight of the polyether polyol.

22. A method for rapidly curing and improving the compression set properties of a flexible polyether derived polyurethane foam which comprises:
adding a curing agent of melamine to a polyurethane foam forming composition containing a polyether polyol, an organic isocyanate compound, and a blowing agent, said curing agent being added in an amount effective to cause the rapid reaction of a sufficient number of remaining isocyanate groups with moisture in the foam to rapidly cure the resultant foam and improve the compression set properties thereof but less than 5 parts by weight based on 100 parts by weight of the polyether polyol and
forming the polyurethane foam from said foam-forming composition, whereby said curing agent cures substantially all the resultant foam.

23. The method of claim 22 wherein the amount of melamine ranges from between about 0.25 and 4 parts by weight based on 100 parts by weight of the polyether polyol.

24. The method of claim 22 wherein the amount of melamine ranges from between about 1 and 2 parts by weight based on 100 parts by weight of the polyether polyol.

25. A method for rapidly curing and improving the compression set properties of a flexible polyether derived polyurethane foam which comprises:
adding a curing agent of cyanuric acid, 2,6-diamino pyridine, dicyandiamide, formamide, 2-hydroxy benzimidazole, 3-amino-1,2,4-triazole, hypoxanthine, caprolactam, 3-amino-1,2,4-triazine, 4,4'-methylene dianiline, aniline, to a polyurethane foam forming composition containing a polyether polyol, an organic isocyanate compound, and a blowing agent, said curing agent being added in an amount effective to cause the rapid reaction of a sufficient number of remaining isocyanate groups with moisture in the foam to rapidly cure the resultant foam and improve the compression set properties thereof but less than 5 parts by weight based on 100 parts by weight of the polyether polyol; and
forming the polyurethane foam from said foam-forming composition, whereby said curing agent cures substantially all the resultant foam.

26. The method of claim 25 wherein the curing agent is present in an amount ranging from between about 0.25 and 4 parts by weight based on 100 parts by weight of the polyether polyol.

27. The method of claim 25 wherein the amount of curing agent ranges from between about 1 and 2 parts by weight based on 100 parts by weight of the polyether polyol.

28. The composition of claim 1 wherein the curing agent is substantially insoluble in the foam forming components.

29. The foam of claim 10 wherein the curing agent is substantially insoluble in the foam forming components.

30. The method of claim 19 wherein the curing agent is substantially insoluble in the foam forming components.

31. The composition of claim 1 wherein the polyether polyol is a conventional, unmodified polyether polyol.

32. The composition of claim 10 wherein the polyether polyol is a conventional, unmodified polyether polyol.

33. The method of claim 19 wherein the polyether polyol is a conventional, unmodified polyether polyol.

34. A flexible polyether derived polyurethane foam forming composition comprising a conventional, unmodified polyether polyol; an organic isocyanate compound; water in an amount sufficient to act as a blowing agent; and melamine in an amount effective to rapidly cure the resultant foam and concommittantly to improve the compression set properties of the foam but less than 5 parts by weight based on 100 parts by weight of the polyether polyol.

* * * * *